US012614035B2

(12) United States Patent
Huang et al.

(10) Patent No.: US 12,614,035 B2
(45) Date of Patent: Apr. 28, 2026

(54) RETRIEVAL AUGMENTED GENERATION

(71) Applicant: INTUIT INC., Mountain View, CA (US)

(72) Inventors: Jolene Huang, Olympia, WA (US); Pankaj Rastogi, Fremont, CA (US); Spriha Awasthi, Superior, CO (US); Yiran Huang, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 306 days.

(21) Appl. No.: 18/478,613

(22) Filed: Sep. 29, 2023

(65) Prior Publication Data

US 2025/0111159 A1        Apr. 3, 2025

(51) Int. Cl.
| | |
|---|---|
| *G06F 17/00* | (2019.01) |
| *G06F 16/34* | (2019.01) |
| *G06F 40/295* | (2020.01) |
| *G06F 40/30* | (2020.01) |

(52) U.S. Cl.
CPC .......... *G06F 40/295* (2020.01); *G06F 16/345* (2019.01); *G06F 40/30* (2020.01)

(58) Field of Classification Search
None
See application file for complete search history.

(56) References Cited

U.S. PATENT DOCUMENTS

| | | | | |
|---|---|---|---|---|
| 11,468,238 | B2 * | 10/2022 | Tiwari ................... | G06F 40/289 |
| 2023/0037077 | A1 * | 2/2023 | Gutta ..................... | G06N 20/20 |
| 2025/0181899 | A1 * | 6/2025 | Ajmera ................ | G06N 3/0475 |

* cited by examiner

*Primary Examiner* — Satwant K Singh
(74) *Attorney, Agent, or Firm* — Patterson + Sheridan, LLP

(57) ABSTRACT

Certain aspects of the present disclosure provide techniques retrieval augmented generation of language model responses using an embedding database. Embeddings for data is stored in an embedding database. When a prompt related to the data is received, relevant embeddings may be retrieved from the database and used generate an augmented prompt based on the initial prompt and the retrieved embeddings from the database. The augmented prompt can be input into a machine learning model. Although the model may be unaware of the data from which the embeddings of the embedding database were generated, the augmented prompt enables the model to use the data to improve breadth and depth of responses.

18 Claims, 5 Drawing Sheets

100

305

Connect Data Source

310

Receive Data

320

Validate Data

330

Count Tokens

340

Receive Embedding Model Selection

350

Convert Text to Embeddings

360

Store Embeddings

370

Receive Language Model Selection

380

Receive Maximum Response Length

385

Receive Question

390

Augment Question

395

Generate Response

300

405

Receive Corpus of Data

410

Chunk Data

420

Generate Embeddings for Chunks

430

Populate Database with Embeddings

440

Receive prompt

450

Convert Prompt to Embedding(s)

460

Perform Search based on Embeddings

470

Augment Prompt with Search Results

480

Generate Response

485

Provide Response

400

RETRIEVAL AUGMENTED GENERATION

INTRODUCTION

Aspects of the present disclosure relate to generating responses from models using prompts that have been augmented with information from related embeddings retrieved from a structured database.

BACKGROUND

Machine learning models have become useful in a variety of applications, including for language modelling. An increasing number of large language models have become publicly and commercially available, for free or for purchase. Many such large language models have been sufficiently trained to perform well in comprehending and generating natural language, with limitations.

In many different applications, various types of models are trained to generate output based on inferences learned from input data. The largest models are those that have been trained using a great deal of data. However, training and maintaining such models is expensive and time-consuming, and training and updating are generally both performed offline. Therefore, publicly available models intrinsically will be unaware of certain types of data, such as recent data or private data not used in training. Since it may be impossible to input the requisite information as data into a model, a model may 'hallucinate' and fabricate an inaccurate response, or it may be impossible for a model to perform a requested task at all if the requisite information is missing.

Accordingly, techniques are needed that enable such models to generate more meaningful responses with less hallucinations, and improved responsiveness, relevancy, and context, particularly for requested tasks related to recent or private information.

BRIEF SUMMARY

Certain embodiments provide a computer-implemented method for retrieval augmented generation, such as for generating responses to prompts using a machine learning model or large language model. In various embodiments, methods disclosed herein comprise: receiving a prompt from a user at an endpoint; providing the prompt to an embedding module to generate an embedding for the prompt; retrieving one or more embeddings from a vector database based on the embedding for the prompt; generating an augmented prompt based on the one or more embeddings and the embedding for the prompt; generating a response to the augmented prompt using a machine learning model and using a context of the one or more embeddings as a context for the machine learning model; and providing the response to the user at the endpoint.

Other embodiments provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Using retrieval augmented generation as described herein, augmented prompts can be generated for language models. The augmented prompts can result in a more comprehensive and deeper understanding of the prompt by the model, which results in a broader range of answerable questions and more detailed and accurate results, with less hallucination problems. In particular, information contained in recent or private data can be included in such an augmented prompt, so that a large language model can consider such information despite not having been trained using the information.

Using various techniques disclosed herein, prompts are augmented by using a similarity search of embeddings in a vector storage database to retrieve embeddings that are relevant to a prompt, such as based on similarity (e.g., cosine similarity) between the embeddings and one or more corresponding embeddings that are generated based on a prompt. This allows relevant information to be retrieved and used as context to augment prompts for a language model. Thus, techniques described herein provide a technical solution to the technical problem of using a machine learning model to answer questions that require information not included in the training data used to train the machine learning model. For example, by using embeddings to retrieve relevant information to a prompt from one or more separate data sources and augmenting the prompt with the relevant information prior to providing the prompt as input to a machine learning model, embodiments of the present disclosure allow the machine learning model to be used to produce accurate results that could not otherwise be obtained using conventional techniques.

Example Computing Environment for Retrieval Augmented Generation

Figure 1:
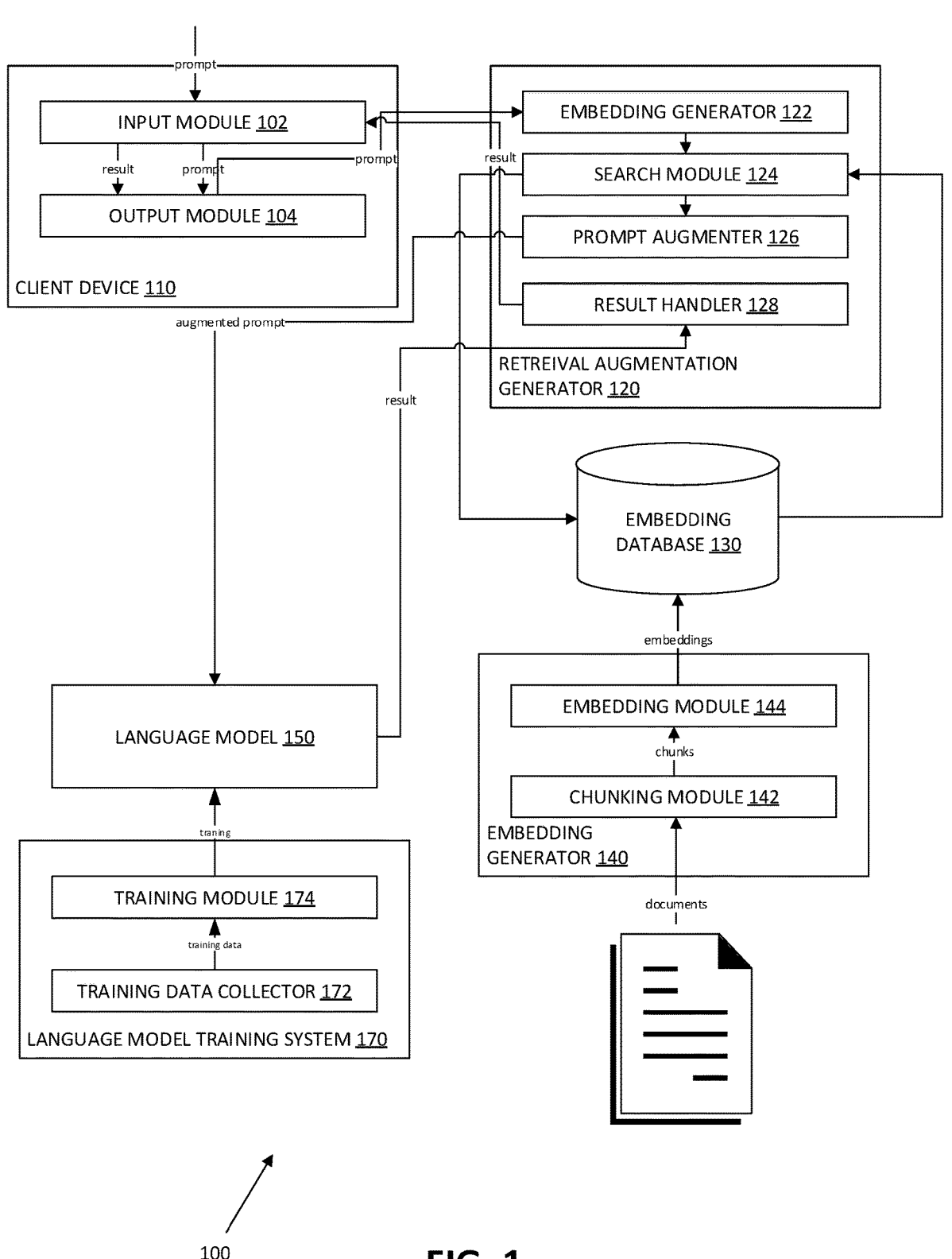
FIG. 1 illustrates an example computing environment in which retrieval augmented generation may be performed, according to various embodiments of the present disclosure.

FIG. 1 illustrates an example computing environment 100 in which retrieval augmented generation may be performed.

As illustrated, computing environment 100 includes a client device 110 in communication with a retrieval augmentation generator 120.

As shown, the client device 110 includes an input module 102 and an output module 104. In the example shown, the input module accepts input, such as a prompt. The input is then provided to the output module, and the input is then passed to the retrieval augmentation generator 120 by the output module 104. The input may be received from a computing device or human user. The prompt in some cases can include a context. For example, the prompt may be received from a user device running a user application on the client device. Various data and metadata associated with the application may be included in the prompt. The prompt may also include natural language input, such as a query entered by a user.

In FIG. 1, the retrieval augmentation generator 120 includes an embedding generator 122, a search module 124, a prompt augmenter 126, and a result handler 128. The embedding generator 122 receives the prompt from the output module 104 of the client device 110. The embedding generator 122 generates one or more embeddings for the prompt, such as by generating a vector representation of a query, data, and metadata associated with the prompt. Generation of embeddings may involve the use of an embedding model or other technique as described in more detail below with respect to FIG. 2. The one or more embeddings are provided to the search module 124, and the search module 124 searches for and retrieves one or more stored embeddings from the embedding database 130 based on the one or more embeddings for the prompt. In various embodiments, the stored embeddings can be selected based on a similarity to the one or more embeddings for the prompt using cosine similarity, semantic search, various similarity algorithms, or other techniques for vector comparison.

As shown, the embedding database 130 includes embeddings stored in the database that have been generated by an embedding generator 140. The embedding generator 140 includes a chunking module 142 and an embedding module 144. The chunking module receives various documents or other data and chunks the data into chunks. The chunked data is passed to the embedding module 144, which generates embeddings, such as vector representations, for the chunked data. The embedding module may use an embedding model or other technique as described in more detail below with respect to FIG. 2 to generate the embeddings. The embedding module 144 then stores the vector representation in the embedding database 130. In some embodiments, the documents and/or data may be associated with an application or suite of applications including an instance running on the client device from which the prompt is entered. Thus, data for a suite of applications can be chunked and embedded into the embedding database. The data may be particularly relevant to a prompt, but may be unknown to any publicly available generative model. Using the embeddings retrieved from the embedding database, an augmented prompt is generated that allows improved generation using a language model, based on the particularly relevant data from which the stored embeddings are generated and which is not available to the model.

In the example of FIG. 1, the prompt augmenter 126 receives the stored embeddings from the search module 124 and generates an augmented prompt based on the prompt and the stored embeddings. The augmented prompt is then provided to a language model 180. In certain embodiments, a domain specific language is used by the embedding generator 122 and/or the embedding module 144. The domain specific language can be communicated via an API by the search module 124 to communicate specific selections of data from the embedding database 130.

In FIG. 1, the model 150 has been previously trained by a language model training system 170 including a training data collector 172 for collecting training data and a training module 174 which performs training of the model based on the data. For example, the training process by which model 150 was trained may be a supervised training process in which training inputs are provided as inputs to model 150, outputs are received from model 150 in response to the inputs, and parameters of model 150 are iteratively adjusted based on comparing the outputs to labels associated with the training inputs in the training data. In some embodiments, the language model 180 is a generative large language model. Such large language models can be expensive and time-consuming to train, and require a large amount of data. Fine-tuning may not be available or desirable in cases. However, using augmented prompts as described herein, an improved result can be generated using a generative large language model.

A result of the language model 150 may be received by the result handler 128. The result handler 128 can perform various actions based on the result. For example, the result may be sent to the client device 110, such as being received by the input module 102. The result may then be provided to the output module and output to a client, such as by being displayed on a monitor connected to the client device.

Example System Architecture for Retrieval Augmented Generation

Figure 2:
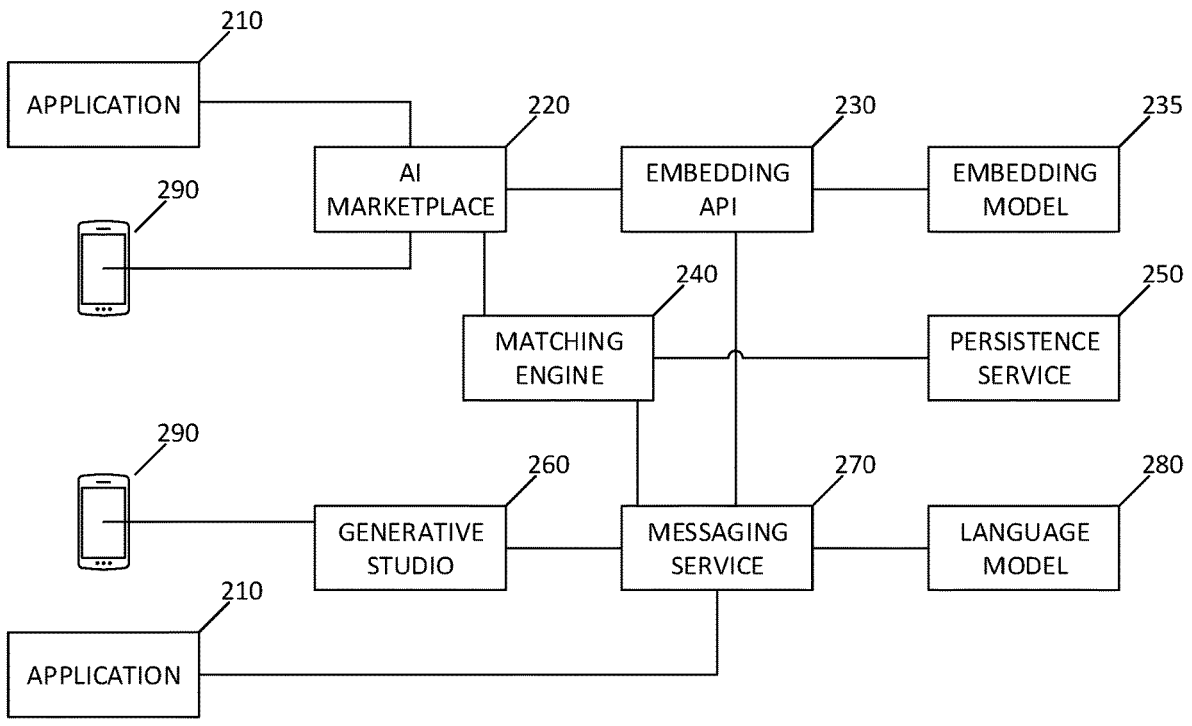
FIG. 2 illustrates an example system architecture for retrieval augmented generation, according to various embodiments of the present disclosure.
Figure 2:

FIG. 2 illustrates an example system architecture 200 for retrieval augmented generation, according to various embodiments of the present disclosure.

As illustrated, the system architecture includes one or more applications 210, an AI marketplace 220, an embeddings API 230, an embeddings model 235, an AI matching engine 240, an internal persistence service 250, a generative studio 260, an AI messaging service 270, and a large language model 280. One or more user devices 290 may be connected to the system architecture or may interact with the system architecture by uploading documents to the AI marketplace 220 or by inputting a query or other prompt into the generative studio 260.

Documents and/or other data can be uploaded from a user device 290 or from one or more of the applications 210 to the AI marketplace 220 via an API of the marketplace 220. Embeddings for the documents and/or other data can be generated by text from uploaded documents being provided to the embeddings model 235 via the embeddings API 230 and the AI marketplace 220. For example, embeddings model 235 may be a machine learning model that is trained to generate an n-dimensional vector representation of a set of input data. An embedding generally refers to a vector representation of an entity that represents the entity as a vector in n-dimensional space such that similar entities are represented by vectors that are close to one another in the n-dimensional space. Embeddings model 235 may be, for example, a neural network or other type of machine learning model that learns a representation (embedding) for an entity through a training process that trains the neural network based on a data set, such as a plurality of features of a plurality of entities. In one example, the embedding model comprises a Bidirectional Encoder Representations from Transformer (BERT) model, which involves the use of masked language modeling to determine embeddings. In other embodiments, the embedding model may involve embedding techniques such as Word2Vec and GloVe embeddings. These are included as examples, and other techniques for generating embeddings are possible.

The embeddings may then be provided to the AI matching engine 240, which processes the embeddings and stores the embeddings at the internal persistence service 250. The persistence service 250 can be any type of suitable data storage solution. In a particular example, a Postgres database may be used to provide data access, searching, and persistence.

The system architecture 200 can be used by a user device 290 or an application 210 to generate a response for a prompt, such as a question, query, or other prompt. For example, a user of a user device 290 may input a question into the device 290. The user device 290 may be in communication with the generative studio 260 such that the prompt is received by the generative studio 260. In response, the generative studio forwards the prompt to the AI messaging service 270. In another use case, an application 210 may send a prompt to the AI messaging service 270 directly.

In response to receiving a prompt, the AI messaging service uses the embeddings API and embeddings model to generate one or more embeddings for the prompt. The one or more embeddings for the prompt are passed to the AI matching engine, which determines the closest, most similar, or most relevant embeddings from those stored in the internal persistence service. Thus, information from documents which were uploaded by an application 210 or a user device 290 that are most relevant to the input prompt can be retrieved from the internal persistence service by determining similar embeddings.

The information retrieved from the internal persistence service can be used to augment the initial prompt. In response to receiving the augmented prompt, the AI messaging service obtains a response from a large language model using the augmented prompt. The response from the large language model is more detailed, accurate, and complete as compared with a response generated without an augmented prompt.

Example Workflow Using Retrieval Augmented Generation

Figure 3:
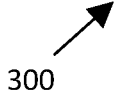
FIG. 3 illustrates an example workflow using retrieval augmented generation, according to various embodiments of the present disclosure.

FIG. 3 illustrates an example workflow 300 using retrieval augmented generation, according to various embodiments of the present disclosure. The workflow 300 may be performed by a server or host computing device, which may be in communication with a user or client computing device via a networked connection.

In the example of FIG. 3, the workflow 300 begins at stage 305 where a data source is connected. In various embodiments, a data source may be identified by a client device and the identified data source may be connected, such as by opening a network connection or mounting a storage location of the data source.

Next, the workflow proceeds to stage 310 where data is received from the data source. Next, the data may be validated at stage 320. For example, certain types of data sources will have a data type, classification, or structure. Data that does not match the type or structure may be invalidated. The workflow may then proceed to stage 330 where a number of tokens of the data is counted. In various embodiments, the number of tokens and/or an indication of the validation of the data may be transmitted to and/or displayed by a client device.

The workflow 300 may then proceed to stage 340 where a selection of an embedding model is received. In some cases, a client device may be sent information based on token count, validation of data, and/or other parameters so that a user may view the information and select an embedding model.

Once a selection of an embedding model is received, the workflow 300 may proceed to stage 350 where the text is converted to embeddings. The embeddings may be generated according the embedding model selection received at stage 340. Next, the workflow proceeds to stage 360 where the embeddings are stored. For example, a Postgres database or other data storage may be the embedding database used to store the embeddings.

The method may next proceed to stage 370 where a chat model selection is received. In various embodiments, one or more language model selections may be received from a client device indicated which model is to be used to generate responses based on input prompts. The workflow 300 then may proceed to stage 380 where a maximum response length is received. For example, a maximum response length may be received from a client device indicating a cap or maximum allowed length for responses generated by a language model in response to an input prompt.

The workflow 300 may then proceed to stage 385 where a question is received. In various embodiments, a question, instructions, or another type of statement, question, or command, including computer code or domain specific language, can be received as a query from a client device. Next, the workflow proceeds to stage 890 where the question is augmented. For example, the question may be augmented by the host device by retrieving embeddings from the embedding database and adding content (e.g., text) corresponding to the retrieved embeddings to the question to generate an augmented prompt.

Next the workflow may proceed to stage 395 where a response is generated. In various embodiments, a large language model is used to generate a response based on the augmented question (e.g., augmented prompt). Once the response has been generated at stage 395, the response may be provided to or accessed by a user or client device, and/or the workflow 300 may conclude.

Example Method of Retrieval Augmented Generation

Figure 4:
FIG. 4 illustrates an example method of retrieval augmented generation, according to various embodiments of the present disclosure.

FIG. 4 illustrates an example method 400 of retrieval augmented generation, according to various embodiments of the present disclosure.

In FIG. 4, the method 400 begins at stage 705 where a corpus of data is received. The corpus of data can include a variety of documents of different types. Various types of data can include text, images, or any other type of data which may be created by a software application.

The method 400 then proceed to stage 410 where the corpus of data is chunked. Chunking the data enables embeddings to be generated separately for various types of units or chunks of data. In various embodiments, the units of data may be defined according to different delimiters, which may be algorithmic and/or configurable according to one or more classifications of data. In a particular example, data chunks are defined that represent one or more objects or object classes or types associated with a particular software application and/or account.

In various embodiments, preprocessing of the prompt may occur before chunking or stages of chunking and being used as input into for a model. Preprocessing may include adding chat history and/or parsing a chat history of the user using of tags, filters, or other search space limiting to determine suitable segments. Chat histories from a plurality of other users may also be added for relevant contextual information. Preprocessing may be used to determine a class of the prompt. For example, whether the prompt relates to a product question, or an account question, and one or more actions may be taken based on a preprocessing, such as tagging the preprocessed data using the determined class.

Preprocessing may use a local language model or an external model to generate a summary of the relevant contextual information, which may be included in or which may replace the prompt prior to generating an embedding from the prompt that is used for performing searching and retrieval.

The method 400 then proceeds to stage 420 where embeddings are generated for the chunks. For example, a vector representation maybe used as a numerical representation of a chunk of data, and the chunks may be each embedded into a vector representation for improved searching and processing. In some embodiments, an embedding API can be used, such as Azure OpenAI embeddings API. In some embodiments, a private language model could be used to convert text or chunks into embeddings, which may be hosted in a location accessible to an endpoint. Next, the method 400 may proceed to stage 430 where a database is populated with the embeddings.

The method 400 may then proceed to stage 440 where a prompt is received, such as by being input by a user of a client device that is used to access the method. In certain embodiments, the prompt may undergo one or more stages of preprocessing. Preprocessing the prompt may include searching a chat history for the user or for other users for a prompt matching or similar to the prompt being preprocessed. In some cases, the prompt and a chat history may be used as inputs into a preprocessing language model to generate a standalone prompt. In certain embodiments, such a standalone prompt may be used in subsequent steps for performing a vector storage database similarity search. In certain embodiments, it may be determined from the standalone prompt that no similarity search from a vector store will be performed prior to using the standalone prompt to generate a response from a large language model. For example, if the standalone prompt is determined to relate to data that is available to the model (e.g., based on a record of data used to train the model, based on a date of the model's most recent training, and/or the like), the standalone prompt may be provided directly to the model without augmentation. In the case that inputting the prompt and chat history into the preprocessing language model results in a standalone prompt known to likely result in valid, and/or high quality response, computational resources may be saved by inputting the standalone prompt without performing a similarity search.

From stage 440 where the prompt is received, the method 400 may proceed to stage 450 where the prompt is converted to one or more embeddings. Then the method may proceed to stage 460 where a search is performed based on the one or more embeddings which were generated via conversion from the prompt.

The method may next proceed to stage 470 where the prompt is augmented with search results. For example, using information retrieved from a database, and retrieved based on the prompt, an augmented prompt can be generated. In certain embodiments, the information retrieved from the database comprises vectorized representations of chunked application data which are stored in a database. Storing the embeddings in a vector database may enable advanced searching and relational matching, such as provided, for example, by OpenSearch.

In various applications, the augmented prompt may include contextual information retrieved from a database that is used as a context for the prompt. In some applications, a newly generated prompt may be generated based on an initial prompt and information or data retrieved from a database based on the initial prompt. Regardless of whether the initial prompt is used with added contextual information or a newly generated prompt is used, the augmented prompt may be generated based on a maximum length or token size limit. Relevant contextual information retrieved from the database can be algorithmically processed to select the most relevant information within a given token size limit.

From stage 470 where the prompt is augmented, the method 400 may proceed to stage 480 where a response is generated. In various examples, the augmented prompt is provided to language models or large language models in various contexts. In general, the additional contextual information included in the augmented prompt is processed and understood by the model, enabling the model to make improved associations and resulting in more accurate and detailed results, with less hallucination as compared to a prompt lacking augmentation.

An API defined by the augmented prompt may be called on by the language model to retrieve additional information used for generating the response to the augmented prompt. Where a particular API is used to generate embeddings, that particular API may be called on by the large language model. In embodiments where a private language model is located at a local endpoint, the private language model may be used by the language model or large language model to retrieve additional information used for generating the response to the augmented prompt.

From stage 480 where the response is generated, the method 400 may proceed to stage 485 where the response is provided. For example, once the response is received by an end user or other endpoint, the method 400 may conclude. In general, once provided, the response may be displayed or otherwise output on a client device that is used access the method.

Example System for Retrieval Augmented Generation

Figure 5:
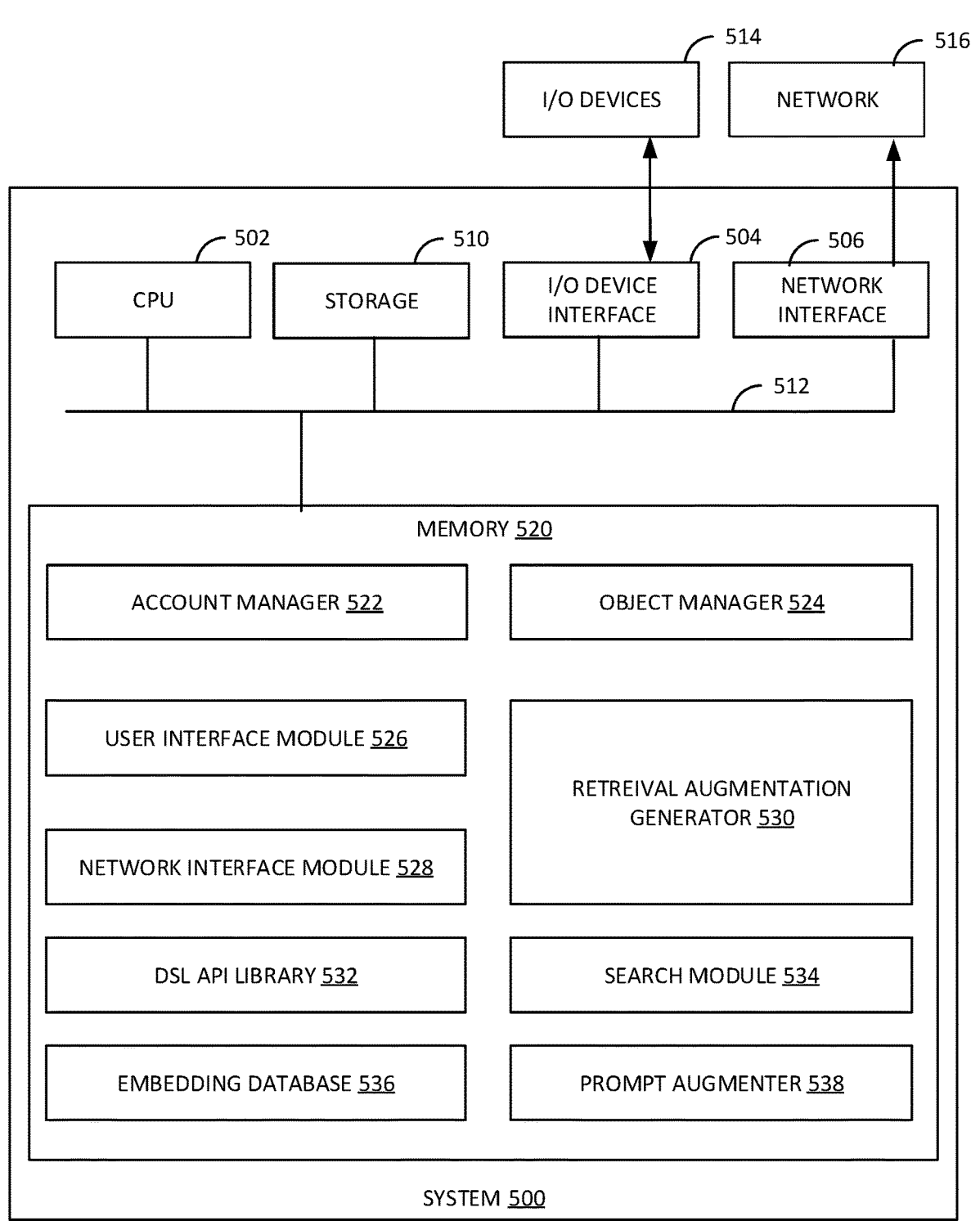
FIG. 5 illustrates an example system configured to perform the retrieval augmented generation methods, according to various embodiments of the present disclosure.

FIG. 5 illustrates an example system 500 configured to perform the methods described herein, including, for example, method 400 of FIG. 4. In some embodiments, system 500 may act as a retrieval augmentation generator, such as the retrieval augmentation generator 120 of FIG. 1.

As shown, system 500 includes a central processing unit (CPU) 502, one or more I/O device interfaces 504 that may allow for the connection of various I/O devices 514 (e.g., keyboards, displays, mouse devices, pen input, etc.) to the system 500, network interface 506 through which system 500 is connected to network 516 (which may be a local network, an intranet, the internet, or any other group of computing devices communicatively connected to each other), a memory 520, storage 510, and an interconnect 512. The I/O devices 514 and/or network interface 506 may be used to receive a query in a natural language utterance through a chatbot application and output a response to the query generated based on extracting operators and operands from the natural language utterance.

CPU 502 may retrieve and execute programming instructions stored in the memory 520. Similarly, the CPU 502 may retrieve and store application data residing in the memory 520 and/or storage 510. The interconnect 512 transmits programming instructions and application data, among the CPU 502, I/O device interface 504, network interface 506, memory 520, and/or storage 510. CPU 502 is included to be representative of a single CPU, multiple CPUs, a single CPU having multiple processing cores, and the like.

Memory 520 is representative of a volatile memory, such as a random access memory, or a nonvolatile memory, such as nonvolatile random access memory, phase change random access memory, or the like. As shown, memory 520 includes an account manager 522, an object manager 524, a user interface module 526, a retrieval augmentation generator 530, a domain specific language application programming interface library 532, a search module 534, an embedding database 536, and a prompt augmenter 538.

The account manager 522 may be used to manage information associated with particular users of the system 500. For example, the account manager may be used to authenticate a user or provide user profile information. The object manager 524 may be used to manage objects, such as generating or storing chat histories, associated with or used by the system 500. In various embodiments, a user interface module 526 is included to prepare data for output to one or more of the I/O devices 514 via the I/O interface 504. Network interface module 528 may similarly prepare data for output to one or more locations on the network 516 via the network interface 506.

The retrieval augmentation generator 530 may use the library 532 to generate an API call using a domain specific (or other) language. The search module 534 may be used to execute search requests on the embedding database 536 by making an API call to retrieve relevant embeddings using, for example, a similarity search or semantic similarity search that compares one or more embeddings of a prompt to embeddings in the embedding database to determine the relevant embeddings. The search module may also use tags, labels, or filters to specify a selection of embeddings from which a relevant embedding may be retrieved. The prompt augmenter 538 may receive a prompt and add context to the prompt or generate a new prompt based on data retrieved from the embedding database 536.

Example Clauses

Aspect 1: A method, comprising: receiving a prompt from a user at an endpoint; providing the prompt to an embedding module to generate an embedding for the prompt; retrieving one or more embeddings from a vector database based on the embedding for the prompt; generating an augmented prompt based on the one or more embeddings and the embedding for the prompt; generating a response to the augmented prompt using a machine learning model and using a context of the one or more embeddings as a context for the machine learning model; and providing the response to the user at the endpoint.

Aspect 2: The method of Aspect 1, further comprising: receiving a corpus of data; chunking the corpus of data to produce a plurality of data chunks; generating a plurality of embeddings for the plurality of data chunks; and storing the plurality of embeddings in the vector database.

Aspect 3: The method of any of Aspects 1-2, further comprising: determining a segment of the corpus of data corresponds to a conversation; and determining a context of the conversation; wherein chunking the corpus of data comprises generating a data chunk corresponding to the segment, and generating the plurality of embeddings by generating an embedding for the segment that includes metadata defining the context of the conversation as a context for the embedding.

Aspect 4: The method of any of Aspects 1-3, wherein the corpus of text is chunked using a configurable algorithmic delimiter.

Aspect 5: The method of any of Aspects 1-4, further comprising: preprocessing the prompt by performing summarization on the prompt; performing entity extraction on the prompt; and performing classification on the prompt; and retrieving the embedding from the vector database based on a result of preprocessing the prompt.

Aspect 6: The method of any of Aspects 1-5 further comprising: performing, on an embedding of the one or more embeddings, at least one of an insertion operation, an update operation, or a deletion operation.

Aspect 7: The method of any of Aspects 1-6, wherein retrieving one or more embeddings from a vector database comprises: performing a semantic search using a similarity algorithm and the embedding for the prompt to identify one or more similar embeddings in the vector database, the similar embeddings being similar to the embedding for the prompt; and combining the similar embeddings and the embedding for the prompt to create an augmented embedding.

Aspect 8: The method of any of Aspects 1-7, wherein the semantic search is performed using a filter or limited search space.

Aspect 9: The method of any of Aspects 1-8, wherein the prompt comprises a selection from a test data set and the method further comprising validating the response using the test data set.

Aspect 10: The method of any of Aspects 1-9, wherein the prompt is received from a user via a user interface of the endpoint, and wherein the response is displayed to the user on a display associated with the user interface.

Aspect 11: A system comprising: a memory having executable instructions stored thereon; an endpoint having a user interface associated with a display; and one or more processors configured to execute the executable instructions to cause the system to perform a method comprising: receiving a prompt from a user at the user interface; providing the prompt to an embedding module to generate an embedding for the prompt; retrieving one or more embeddings from a vector database based on the embedding for the prompt; generating an augmented prompt based on the one or more embeddings and the embedding for the prompt; generating a response to the augmented prompt using a machine learning model and using a context of the one or more embeddings as a context for the machine learning model; and providing the response to the user on the display.

Aspect 12: The system of Aspect 11, the method further comprising: receiving a corpus of data; chunking the corpus of data to produce a plurality of data chunks; generating a plurality of embeddings for the plurality of data chunks; and storing the plurality of embeddings in the vector database.

Aspect 13: The system of any of Aspects 11-12: the method further comprising: determining a segment of the corpus of data corresponds to a conversation; and determining a context of the conversation; wherein chunking the corpus of data comprises generating a data chunk corresponding to the segment, and generating the plurality of embeddings by generating an embedding for the segment that includes metadata defining the context of the conversation as a context for the embedding.

Aspect 14: The system of any of Aspects 11-13, wherein the corpus of text is chunked using a configurable algorithmic delimiter.

Aspect 15: The system of any of Aspects 11-14, the method further comprising: preprocessing the prompt by performing summarization on the prompt; performing entity extraction on the prompt; and performing classification on the prompt; and retrieving the embedding from the vector database based on a result of preprocessing the prompt.

Aspect 16: The system of any of Aspects 11-15, the method further comprising: performing, on an embedding of the one or more embeddings, at least one of an insertion operation, an update operation, or a deletion operation.

Aspect 17: The system of any of Aspects 11-16, wherein retrieving one or more embeddings from a vector database comprises: performing a semantic search using a similarity algorithm and the embedding for the prompt to identify one or more similar embeddings in the vector database, the similar embeddings being similar to the embedding for the prompt; and combining the similar embeddings and the embedding for the prompt to create an augmented embedding.

Aspect 18: The system of any of Aspects 11-17, wherein the semantic search is performed using a filter or limited search space.

Aspect 19: The system of any of Aspects 11-18, wherein the prompt comprises a selection from a test data set and the method further comprising validating the response using the test data set.

Aspect 20: A non-transitory computer readable storage medium comprising instructions, that when executed by one or more processors of a computing system, cause the computing system to perform a method comprising: receiving a prompt from a user at an endpoint; providing the prompt to an embedding module to generate an embedding for the prompt; retrieving one or more embeddings from a vector database based on the embedding for the prompt; generating an augmented prompt based on the one or more embeddings and the embedding for the prompt; generating a response to the augmented prompt using a machine learning model and using a context of the one or more embeddings as a context for the machine learning model; and providing the response to the user at the endpoint.

Additional Considerations

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middle-ware, microcode, hardware description language, or other-wise. Computer-readable media include both computer stor-age media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a trans-mission line, a carrier wave modulated by data, and/or a computer readable storage medium with instructions stored thereon separate from the wireless node, all of which may be accessed by the processor through the bus interface. Alter-natively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Program-mable Read-Only Memory), EPROM (Erasable Program-mable Read-Only Memory), EEPROM (Electrically Eras-able Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execu-tion of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112 (f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing dis-closed herein is intended to be dedicated to the public regardless of whether such disclosure is explicitly recited in the claims.

What is claimed is:

1. A method, comprising:
receiving a prompt from a user at an endpoint;
preprocessing the prompt by:
    performing summarization on the prompt;
    performing entity extraction on the prompt; and
    performing classification on the prompt;
providing the prompt to an embedding module to generate
    an embedding for the prompt;
retrieving one or more embeddings from a vector database
    based on the embedding for the prompt and based on a
    result of the preprocessing of the prompt;
generating an augmented prompt based on the one or
    more embeddings and the embedding for the prompt;
generating a response to the augmented prompt using a
    machine learning model and using a context of the one
    or more embeddings as a context for the machine
    learning model; and
providing the response to the user at the endpoint.

2. The method of claim 1, further comprising:
receiving a corpus of data;
chunking the corpus of data to produce a plurality of data
    chunks;
generating a plurality of embeddings for the plurality of
    data chunks; and
storing the plurality of embeddings in the vector database.

3. The method of claim 2, further comprising:
determining a segment of the corpus of data corresponds
    to a conversation; and
determining a context of the conversation; wherein
chunking the corpus of data comprises
    generating a data chunk corresponding to the segment,
        and
    generating the plurality of embeddings by generating
        an embedding for the segment that includes metadata
        defining the context of the conversation as a context
        for the embedding.

4. The method of claim 2, wherein the corpus of text is chunked using a configurable algorithmic delimiter.

5. The method of claim 1, further comprising:
performing, on an embedding of the one or more embed-
    dings, at least one of an insertion operation, an update
    operation, or a deletion operation.

6. The method of claim 1, wherein retrieving one or more embeddings from a vector database comprises:
performing a semantic search using a similarity algorithm
    and the embedding for the prompt to identify one or
    more similar embeddings in the vector database, the
    similar embeddings being similar to the embedding for
    the prompt; and combining the similar embeddings and the embedding for the prompt to create an augmented embedding.

7. The method of claim 6, wherein the semantic search is performed using a filter or limited search space.

8. The method of claim 1, wherein the prompt comprises a selection from a test data set and the method further comprising validating the response using the test data set.

9. The method of claim 1, wherein the prompt is received from a user via a user interface of the endpoint, and wherein the response is displayed to the user on a display associated with the user interface.

10. A system comprising:

a memory having executable instructions stored thereon;

an endpoint having a user interface associated with a display; and one or more processors configured to execute the executable instructions to cause the system to perform a method comprising:

receiving a prompt from a user at the user interface;

providing the prompt to an embedding module to generate an embedding for the prompt;

retrieving one or more embeddings from a vector database based on the embedding for the prompt, wherein the retrieving the one or more embeddings comprises performing a semantic search using a similarity algorithm and the embedding for the prompt to identify one or more similar embeddings in the vector database, the similar embeddings being similar to the embedding for the prompt;

generating an augmented prompt based on the one or more embeddings and the embedding for the prompt, wherein the generating of the augmented prompt comprises combining the similar embeddings and the embedding for the prompt to create an augmented embedding;

generating a response to the augmented prompt using a machine learning model and using a context of the one or more embeddings as a context for the machine learning model; and providing the response to the user on the display.

11. The system of claim 10, the method further comprising:

receiving a corpus of data;

chunking the corpus of data to produce a plurality of data chunks;

generating a plurality of embeddings for the plurality of data chunks; and storing the plurality of embeddings in the vector database.

12. The system of claim 11, the method further comprising:

determining a segment of the corpus of data corresponds to a conversation; and determining a context of the conversation; wherein chunking the corpus of data comprises generating a data chunk corresponding to the segment, and generating the plurality of embeddings by generating an embedding for the segment that includes metadata defining the context of the conversation as a context for the embedding.

13. The system of claim 11, wherein the corpus of text is chunked using a configurable algorithmic delimiter.

14. The system of claim 10, the method further comprising:

preprocessing the prompt by performing summarization on the prompt;

performing entity extraction on the prompt; and performing classification on the prompt; and retrieving the embedding from the vector database based on a result of preprocessing the prompt.

15. The system of claim 10, the method further comprising:

performing, on an embedding of the one or more embeddings, at least one of an insertion operation, an update operation, or a deletion operation.

16. The system of claim 10, wherein the semantic search is performed using a filter or limited search space.

17. The system of claim 10, wherein the prompt comprises a selection from a test data set and the method further comprising validating the response using the test data set.

18. A non-transitory computer readable storage medium comprising instructions, that when executed by one or more processors of a computing system, cause the computing system to perform a method comprising:

receiving a corpus of data;

determining a segment of the corpus of data corresponds to a conversation;

determining a context of the conversation;

chunking the corpus of data to produce a plurality of data chunks, wherein the chunking of the corpus of data comprises generating a data chunk corresponding to the segment;

generating a plurality of embeddings for the plurality of data chunks, wherein the generating of the plurality of embeddings comprises generating an embedding for the segment that includes metadata defining the context of the conversation as a context for the embedding;

storing the plurality of embeddings in a vector database;

receiving a prompt from a user at an endpoint;

providing the prompt to an embedding module to generate an embedding for the prompt;

retrieving one or more embeddings from the vector database based on the embedding for the prompt;

generating an augmented prompt based on the one or more embeddings and the embedding for the prompt;

generating a response to the augmented prompt using a machine learning model and using a context of the one or more embeddings as a context for the machine learning model; and providing the response to the user at the endpoint.

* * * * *